US012293097B2

(12) United States Patent
Soltaniyeh et al.

(10) Patent No.: US 12,293,097 B2
(45) Date of Patent: May 6, 2025

(54) SYSTEMS AND METHODS FOR NEAR-STORAGE PROCESSING IN SOLID STATE DRIVES

(71) Applicant: Samsung Electronics Co., Ltd., Suwon-si (KR)

(72) Inventors: Mohammadreza Soltaniyeh, San Jose, CA (US); Veronica Lagrange Moutinho Dos Reis, San Jose, CA (US); Matthew Bryson, San Jose, CA (US); Xuebin Yao, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/568,714

(22) Filed: Jan. 4, 2022

(65) Prior Publication Data

US 2023/0099831 A1 Mar. 30, 2023

Related U.S. Application Data

(60) Provisional application No. 63/248,424, filed on Sep. 24, 2021.

(51) Int. Cl.
*G06F 3/06* (2006.01)

(52) U.S. Cl.
CPC .......... *G06F 3/0635* (2013.01); *G06F 3/0604* (2013.01); *G06F 3/0634* (2013.01); *G06F 3/0659* (2013.01); *G06F 3/0679* (2013.01)

(58) Field of Classification Search
CPC .... G06F 3/0635; G06F 3/0604; G06F 3/0634; G06F 3/0659; G06F 3/0679; G06F 3/061; G06F 3/0625; G06F 3/0658
See application file for complete search history.

(56) References Cited

U.S. PATENT DOCUMENTS

| 7,472,222 | B2 | 12/2008 | Auerbach et al. |
| 8,595,411 | B2 | 11/2013 | Selinger et al. |
| 8,868,842 | B2 | 10/2014 | Yano et al. |
| 9,086,807 | B2 | 7/2015 | Okada et al. |
| 9,619,180 | B2 | 4/2017 | Malkin |

(Continued)

FOREIGN PATENT DOCUMENTS

KR 20200068564 A 6/2020

OTHER PUBLICATIONS

European Extended Search Report for Application No. 22196363.0, mailed Feb. 22, 2023.

(Continued)

*Primary Examiner* — Baboucarr Faal
(74) *Attorney, Agent, or Firm* — Renaissance IP Law Group LLP

(57) ABSTRACT

Provided are systems, methods, and apparatuses for computational offload to storage systems. The method can include a first processing element issuing a first request to the storage device; a storage device, responsive to the first request, obtaining first data on the storage device and providing the first data to the first memory for storage; the second processing element reading the first data from the first memory and performing at least one of an operation or a computation on the first data to generate second data; and the second processing element providing the second data to the first processing element.

17 Claims, 13 Drawing Sheets

(56) References Cited

U.S. PATENT DOCUMENTS

| | | | |
|---|---|---|---|
| 9,785,561 B2 | 10/2017 | Ash et al. | |
| 9,887,008 B2 | 2/2018 | Lee et al. | |
| 10,585,819 B2 | 3/2020 | Kachare et al. | |
| 10,635,333 B2 | 4/2020 | Lee | |
| 10,649,927 B2 | 5/2020 | Raghava et al. | |
| 10,768,819 B2 | 9/2020 | Kannan et al. | |
| 10,880,401 B2 | 12/2020 | Maharana et al. | |
| 10,956,346 B1 | 3/2021 | Ben-Yehuda et al. | |
| 11,061,574 B2 | 7/2021 | Kachare et al. | |
| 2008/0189452 A1* | 8/2008 | Merry | G11B 19/044 710/56 |
| 2014/0281140 A1* | 9/2014 | Mehrotra | G06F 3/0635 711/103 |
| 2018/0081804 A1* | 3/2018 | Turner | G06F 9/5083 |
| 2019/0005176 A1 | 1/2019 | Illikkal et al. | |
| 2019/0114114 A1* | 4/2019 | Trika | H03M 13/154 |
| 2019/0243787 A1 | 8/2019 | Mittal et al. | |
| 2019/0243796 A1 | 8/2019 | Ping | |
| 2019/0272215 A1 | 9/2019 | Olarig et al. | |
| 2019/0272240 A1 | 9/2019 | Kachare et al. | |
| 2019/0303014 A1* | 10/2019 | Song | G06F 13/16 |
| 2019/0310957 A1* | 10/2019 | Olarig | H03M 13/154 |
| 2019/0310958 A1* | 10/2019 | Pinto | G06F 13/4022 |
| 2019/0370012 A1 | 12/2019 | Sears et al. | |
| 2020/0183582 A1 | 6/2020 | Kachare et al. | |
| 2021/0278998 A1 | 9/2021 | Li | |
| 2022/0318089 A1* | 10/2022 | Sridharan | G06F 3/0619 |

OTHER PUBLICATIONS

Kang, Yangwook et al., "Enabling Cost-Effective Data Processing with Smart SSD," 2013 IEEE 29th Symposium on Mass Storage Systems and Technologies (MSST), 2013, 12 pages.

Lee, Joo Hwan et al., "SmartSSD: FPGA Accelerated Near-Storage Data Analytics on SSD," IEEE Computer Architecture Letters, vol. 19, No. 2, 2020, pp. 114-117.

Yoon, Jin Hyuk et al., "Chameleon: A High Performance Flash/FRAM Hybrid Solid State Disk Architecture", IEEE Computer Architecture Letters, vol. 7, No. 1, 2008, pp. 17-20.

European Office Action for Application No. 22196363.0, mailed May 28, 2024.

\* cited by examiner

SYSTEMS AND METHODS FOR NEAR-STORAGE PROCESSING IN SOLID STATE DRIVES

RELATED APPLICATIONS

The present application claims the benefit of U.S. provisional application Ser. No. 63/248,424 entitled "SYSTEMS, METHODS, AND APPARATUS FOR NEAR STORAGE PROCESSING FOR RECOMMENDATION INFERENCE" filed on Sep. 24, 2021, which is incorporated herein by reference in its entirety.

FIELD

The disclosure relate generally to near-storage processing, and more particularly to systems and methods for near-storage processing in solid state drives.

BACKGROUND

The present background section is intended to provide context only, and the disclosure of any concept in this section does not constitute an admission that said concept is prior art.

A computational storage device may include one or more processing resources that may operate on data stored within the device. A host may offload a processing task to the storage device, for example, by sending a user program and/or input data for the user program to the device. The one or more processing resources may execute the user program and send output data from the user program to the host.

The above information disclosed in this background section is only for enhancement of understanding of the background of the disclosure and therefore it may contain information that does not constitute prior art.

SUMMARY

In various embodiments, described herein include systems, methods, and apparatuses for offloading operations and/or computations to a storage device such as a solid state drive (SSD) in association with a processing element.

In various embodiments, a system is disclosed. The system can include: a storage device in communication with a first processing element and a second processing element; the second processing element comprising a first memory, the first memory connected to the storage device via a first connection. The first processing element can issue a first request to the storage device; the storage device, responsive to the first request, can obtain first data on the storage device and provides the first data to the first memory for storage; the second processing element can read the first data from the first memory and performs at least one of an operation or a computation on the first data to generate second data; and the second processing element can provide the second data to the first processing element.

In an embodiment, the first processing element provides metadata to the second processing element, the metadata associated with the computation. In another embodiment, the metadata includes a location of the first data on the first memory. In one embodiment, the storage device includes a solid state drive and the first memory includes a dynamic random-access memory (DRAM). In an embodiment, the first processing element includes a central processing unit of a host device. In some embodiments, the second processing element includes at least one of a field-programmable gate array (FPGA), a complex programmable logic device (CPLD), an application-specific integrated circuit (ASIC), or a co-processor and the first connection includes a peer-to-peer (P2P) connection. In an embodiment, a block size associated with the first memory can be set by an application associated with the first processing element. In another embodiment, the second processing element communicates with the storage device via a switch. In an embodiment, the switch includes a Peripheral Component Interconnect Express (PCIe) switch. In an embodiment, the first memory includes a first portion accessible by the first processing element and accessible by the second processing element and can be used for the providing the second data to the first processing element.

Similarly, non-transitory computer-readable media, devices, and systems for performing substantially the same or similar operations as described above are further disclosed.

Accordingly, particular embodiments of the subject matter described herein can be implemented so as to realize one or more of the following advantages. The disclosed systems can provide caching capabilities for processing elements and storage components and thus allow applications to be accelerated with a solid state drive having a processing element. For instance, the disclosed systems can use FPGA DRAM as a cache to minimize data accesses to the storage device. The cache can be managed by one or more software modules that reside at least partially on the host and can be customizable based on the application's needs. The kernel on the FPGA can receive metadata provided by a central processing unit (CPU) on a host device to locate the data on its DRAM or move the data around on the DRAM. While the cache policies can be changed on the host side, there is no need to change the kernel on the FPGA, thereby avoiding FPGA recompilation.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
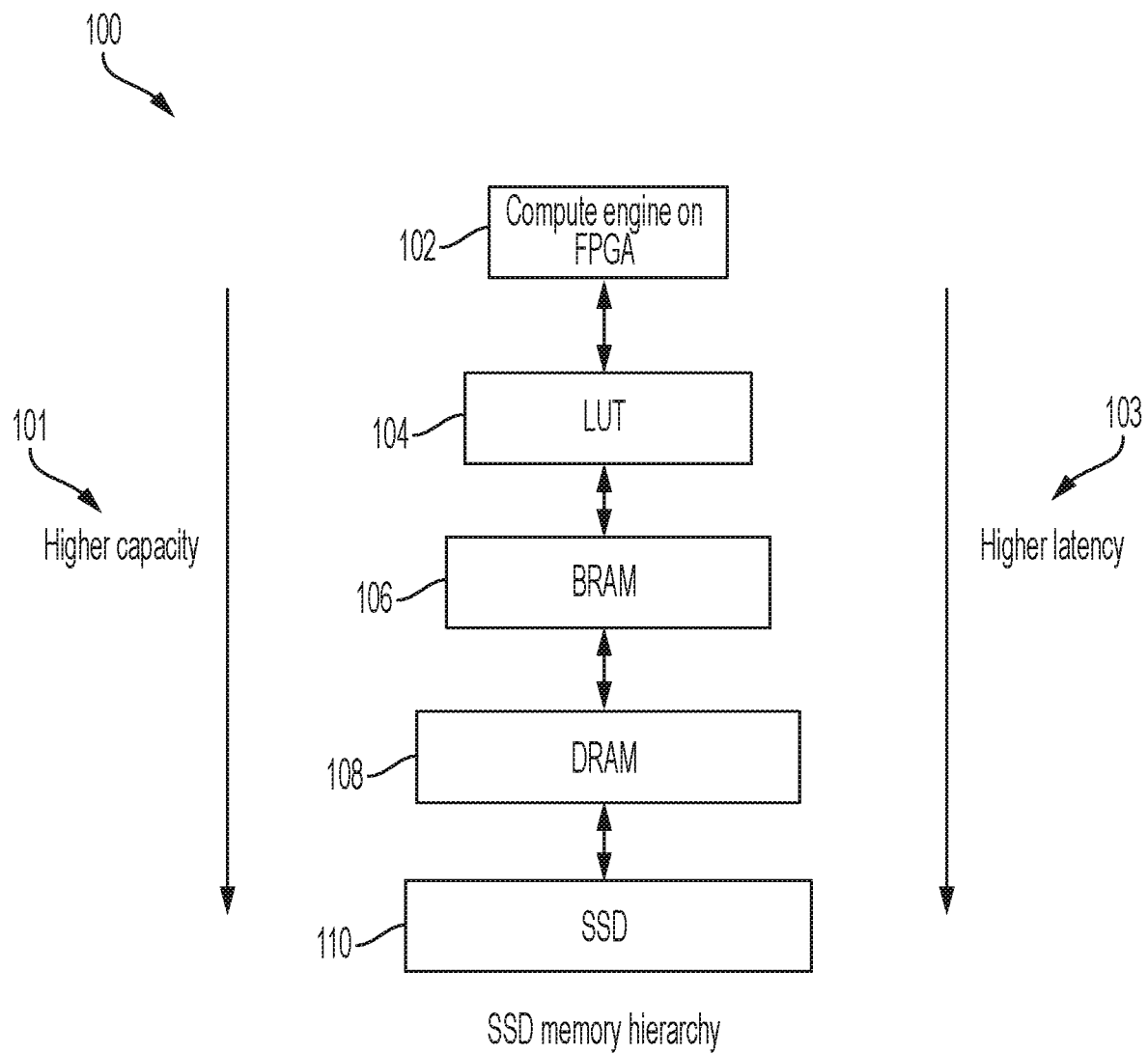
FIG. 1 shows an example diagram representing different memory types and respective latencies and capacities, in accordance with example embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Various machine-learning based applications such as deep learning-based recommendation systems are deployed in numerous Internet services, including social media, entertainment services, and search engines, to provide users with the most relevant and personalized content. Production scale neural models consist of large embedding tables with billions of parameters. DRAM-based recommendation systems may impose a high infrastructure cost and limit the size of the deployed models. Recommendation systems based on solid-state drives (SSDs) offer larger storage and are a promising replacement for DRAM-based solutions.

In some respects, offloading computations to a processing element such as an FPGA on a storage device such as a solid state drive (SSD) may be effective in reducing the data traffic between storage and host. Additionally, performing at least a portion of the offloaded computation with customized hardware (e.g., programmed FPGA circuits) can provide increased energy efficiency and performance in comparison to un-offloaded cases or cases where the hardware is a general purpose processor. In many situations, applications deployed on a solid state drive may include those with a relatively regular and predictable memory access patterns such as compression, database queries, and/or the like. However, for applications with more irregular and unpredictable memory access patterns such as neural recommendation systems, system performance may be reduced, for example, due to higher access latency of the SSD compared to the memory (e.g., dynamic random access memory, DRAM) and on-chip memory on the FPGA.

In various aspects, embodiments of the present disclosure are generally directed to addressing applications with irregular memory access patterns, as described above, and can allow applications such as neural recommendation system to benefit from near-storage computation on a solid state drive. In particular, the disclosed system can use different memory components (e.g., DRAM and/or on-chip memory of an FPGA) and use such memory components as a cache in order to minimize the frequency of access to the SSD by using the spatial and temporal localities of data to be processed. In other aspects, software (e.g., software at least partially stored on the host) can be used to manage the cache (e.g., the DRAM and block RAM, BRAM which can include dual-port RAM module instantiated into the FPGA fabric to provide on-chip storage for a relatively large set of data) for the kernel on the FPGA in a solid state drive. Additionally, the disclosed systems include a set of metadata that allows a processor (e.g., a CPU) of the host to communicate the information to the kernel on the FPGA. In some aspects, the kernel can be configured to perform the computation while reading data from global memory, as necessary. The kernel writes data back to global memory and can notify the host that it has completed its task.

In various aspects, a host processor and a storage device processing element (e.g., a CPU in association with a processing element such as an FPGA) can communicate via a caching technique that allows the kernel on the processing element (e.g., the FPGA in the SSD) to utilize the processing element's DRAM and on-chip memory as a cache while data resides primarily on the SSD. In other aspects, the cache can be managed by software on the CPU and hence one or more cache policies can be customized (e.g., by a user and/or an application), for example, based on the application demands and data profiling results. In other aspects, hardware (e.g., the processing element such as the FPGA) may not have access or may have limited access to the cache policy in use on the system and thus the hardware can remain operational when the cache policies are being changed. In various aspects, the disclosed systems can provide mechanisms for applications with a relatively high storage requirement and irregular and random memory access patterns to use solid state drives for computational offloading with relatively high efficacy. As noted, one such application includes neural recommendation system where the size of embedding tables used in such models can reach relatively large quantities of memory (e.g., giga bytes of memory) while the accesses to the embedding tables may be at least partially random. In some respects, such embedding tables can be similar to a lookup table, where for a given input (e.g. a word or any category label), a corresponding entry in in the lookup table may be returned. It is understood that the disclosed systems can be used in connection with a variety of different applications (e.g., various machine learning applications and models) and not merely neural recommendation systems.

As noted, the disclosed systems and methods provide caching capabilities for processing elements and storage components and thus allow applications to be accelerated with a solid state drive having a processing element. For instance, the disclosed systems can use FPGA DRAM as a cache to minimize data accesses to the storage device. The cache can be managed by one or more software modules that reside at least partially on the host and can be customizable based on the application's needs. The kernel on the FPGA can receive metadata provided by the CPU to locate the data on its DRAM or move the data around on the DRAM. While the cache policies can be changed on the host side, there is no need to change the kernel on the FPGA, thereby avoiding FPGA recompilation.

In some aspects, the FPGA DRAM can be divided into two regions, (1) a first portion for the peer to peer data that includes fetched data from the SSD (2) a second portion that is used as a cache to store some of the pages that were previously fetched from the SSD. Moreover, the kernel on the FPGA can determined its requested data in one of the two regions. Moreover, the address and the location for each of the accesses can be provided to the kernel on the FPGA by the host CPU via a transmission of the metadata.

In some respects, the metadata can include the location of a particular data in memory (e.g., DRAM) that can be used by the processing element (e.g., FPGA) on the storage device. The metadata can be generated by the host processor (e.g., host CPU). In some aspects, the metadata can include design parameters that can be dependent on how the total DRAM capacity is divided between the P2P region and cache region. The granularity of the blocks in the cache can be a design parameter and can be set based on the application's need. The larger block sizes reduce the overheads of the cache management in the CPU while may result in higher DRAM miss rates. The software cache management on the CPU side can be overlapped with the kernel computation on the FPGA and thus does not impact the overall latency.

FIG. 1 shows an example diagram representing different memory types and respective latencies and capacities, in accordance with example embodiments of the disclosure. In some respects, diagram 100 shows a memory hierarchy including a compute engine on an FPGA 102, a look up table (LUT) 104, a BRAM 106, a DRAM 108, and a SSD 110 that is organized in order of higher capacity 101 and higher latency 103 from top to bottom. In other words, a LUT 104 can have lower capacity and lower latency than a BRAM 106, which can in turn have lower capacity and lower latency than DRAM 108. Accordingly, the disclosed systems can utilize the compute engine on the FPGA 102 (or other processing element of a storage device), and use any of the shown memory elements (or similar elements not shown for brevity) in order to achieve the lowest latency (or similar performance metric) for a given offloaded computation as variously described herein.

Figure 2:
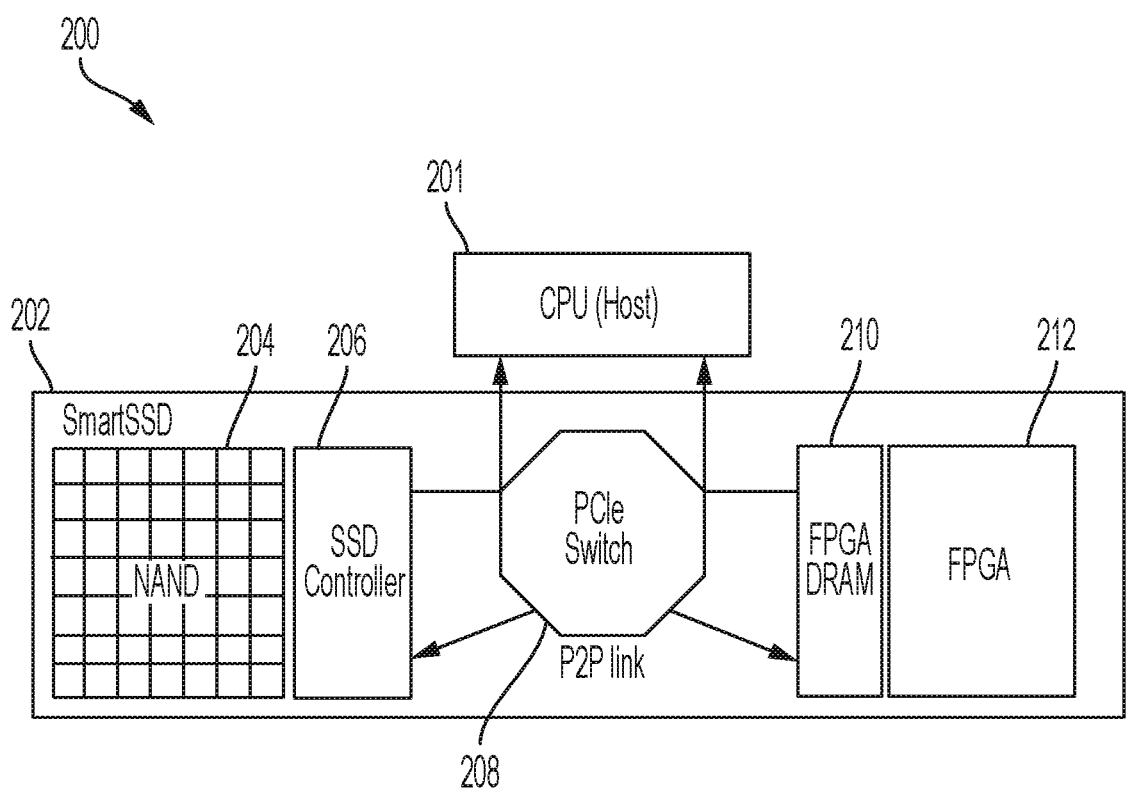
FIG. 2 shows a diagram of an example internal architecture of a storage device in communication with a host process (e.g., a central processing unit, CPU), in accordance with example embodiments of the disclosure.

FIG. 2 shows a diagram of an example internal architecture of a storage device in communication with a host process (e.g., a central processing unit, CPU), in accordance with example embodiments of the disclosure. In some examples, the storage device 202 can include a solid state drive and can include a NAND array (also referred to as a storage component) 204, an SSD controller 206, a processing element such as an FPGA 212, and a FGPA DRAM module 210. The FPGA 212 can communicate with the storage component 204, known as Peer-to-Peer (P2P) data transfer via a switch 208 (e.g., PCIe switch 208), and the FPGA 212 can facilitate near-storage computation. The P2P data transfer can reduce or eliminate unnecessary round-trip traffic between the SSD to the CPU (host) 201 and from the CPU 201 to an FPGA 212.

The FPGA DRAM 210 on the storage device 202 can be accessible by the FPGA 212. In some examples, there can exist a specific region of memory called the common memory area (CMA) (not shown) in the FPGA DRAM 210 that can be accessible both by the FPGA 212 and the CPU (host) 201. This CMA region can be used for directly transferring data between the storage component 204 and the FPGA 212. While the CPU host 201 is not involved in the data movement from the storage device 202 to the FPGA 212 with a peer-to-peer transfer, the CPU host 201 can initiate the data transfer. Besides, the host 201 and the FPGA 212 on the storage device 202 can communicate by mapping the CMA region to the host's 201 address space. The storage device 202 can further support any suitable programming model (e.g., an OpenCL programming model) and any suitable API (e.g., OpenCL APIs) for performing various operations including, but not limited to, kernel launch, memory allocation, data transfers, and/or the like. Further, computation can be offloaded to the FPGA 212 on a storage device 202 either completely or partially. Additionally, the result of the computation performed by the FPGA 212 can be either directly written back to the storage device 202 or the main memory (not shown) accessible by the CPU 201.

In various aspects, the disclosed systems can including the storage device and switch (e.g., PCIe switch 208) can be configured to operate using any suitable storage protocol including any suitable interconnects and/or storage protocols including Peripheral Component Interconnect Express (PCIe), NVMe, NVMe-over-fabric (NVMe-oF), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof.

In some embodiments, the storage device may at least partially implement a coherent (e.g., memory coherent, cache coherent, and/or the like) or memory semantic interface such as Compute Express Link (CXL), and/or a coherent protocol such as CXL.mem, CXL.cache, and/or CXL.IO. Other examples of coherent and/or memory semantic interfaces and/or protocols may include Gen-Z, Coherent Accelerator Processor Interface (CAPI), Cache Coherent Interconnect for Accelerators (CCIX), and/or the like. The storage device can use such an interface to communicate with one or more processing elements (e.g., host CPU, FPGA, and/or the like). Further, the storage device may be connected to one or more hosts and/or other devices through a fabric which may be implemented, for example, with interconnect fabric such as PCIe, network fabric such as Ethernet, and/or the like, or any combination thereof, for example with one or more switches (e.g., switch 208) or interfaces (not shown).

In some respects, the storage device can include any suitable storage media, which may be implemented with any type of nonvolatile storage media based on solid state media, magnetic media, optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

Figure 3:
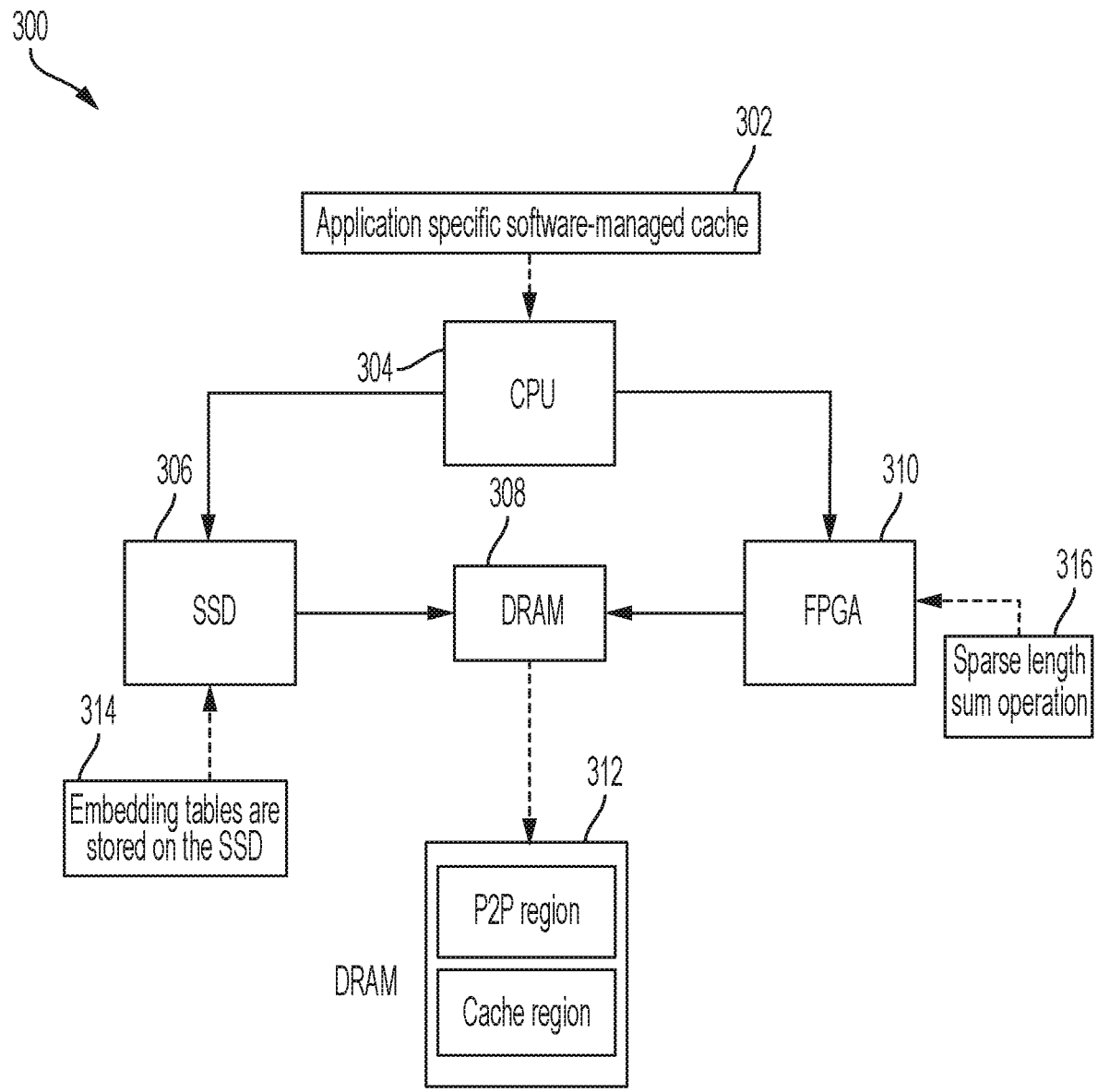
FIG. 3 depicts another example architecture associated with the disclosed systems, in accordance with example embodiments of the disclosure.

FIG. 3 depicts another example architecture associated with the disclosed systems, in accordance with example embodiments of the disclosure. In particular, architecture 300 shows an example system including an application specific software-managed cache 302, a CPU 304, a SSD 306, a DRAM 308 including a P2P region and a cache region 312, an FPGA 310, in addition to some example elements and operations associated with recommendation systems such as embedding tables that are stored on the SSD 314 and a sparse length sum operation 316.

Figure 4:
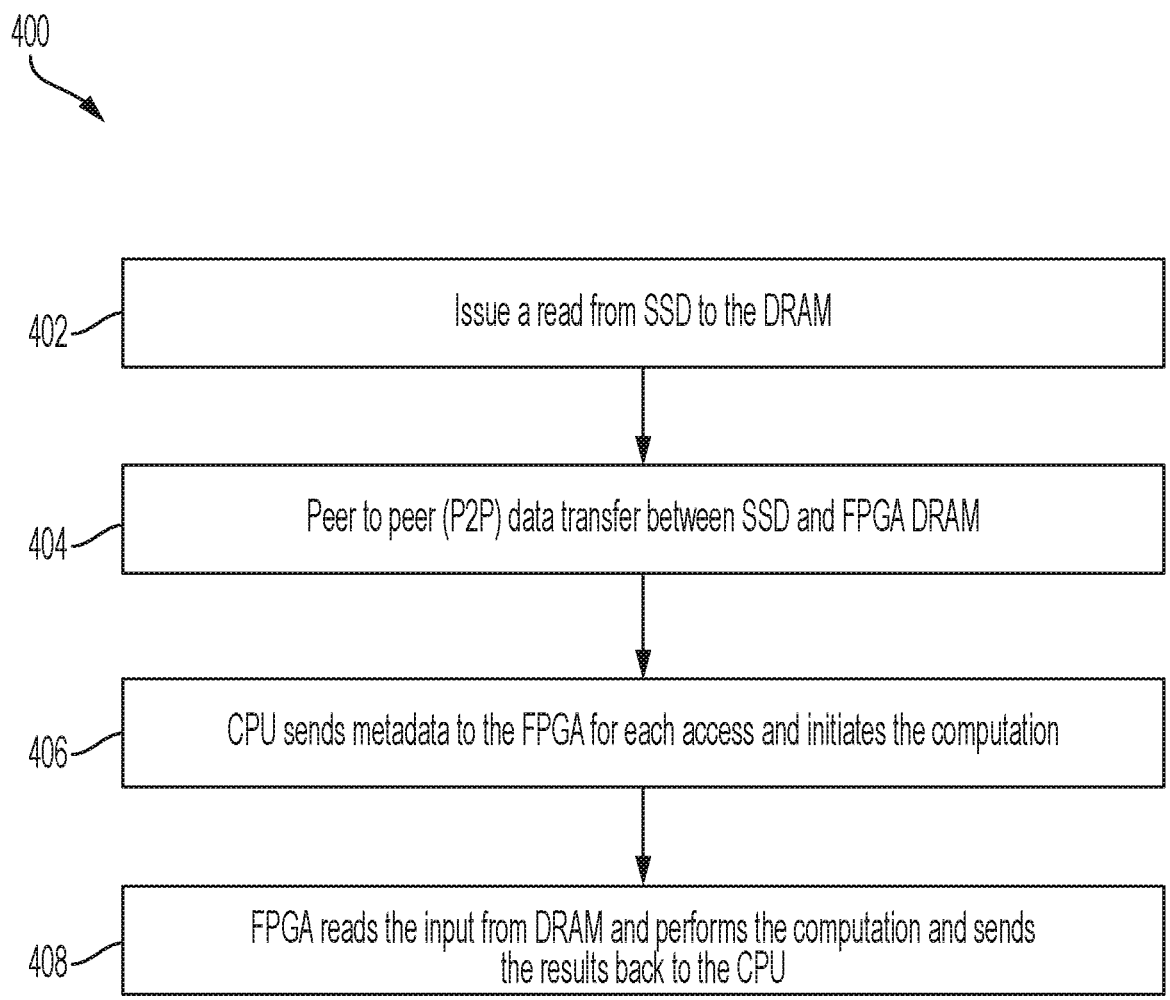
FIG. 4 depicts a diagram of an example flow associated with example operations of the example architecture shown and described above in connection with FIG. 3, in accordance with example embodiments of the disclosure.

FIG. 4 depicts a diagram 400 of an example flow associated with example operations of the example architecture 300 shown and described above in connection with FIG. 3, in accordance with example embodiments of the disclosure. In particular, at block 402, the disclosed systems can issue an operation such as a read command for the SSD to the DRAM. At block 404, the disclosed systems can perform a peer-to-peer (P2P) data transfer between the SSD and the FPGA DRAM. At block 406, a CPU of the disclosed systems can send metadata to the FPGA for each access and can initiate a computation. At block 408, the FPGA can read the input from the DRAM and can perform the computation and send the results back to the CPU.

In some aspects, the disclosure permits applications with relatively high storage requirements irregular and random memory access pattern to use near storage computation with a storage device having a processing element. Further, by putting the software on the host in charge of the cache management, the disclosed systems allows for the customization of the cache policy based on application access patterns. Moreover, the kernel on the FPGA may not change with different cache policies, thereby saving FPGA recompilation. Additionally, software managed cache introduce minimal storage overheads on the host side even for applications with large storage requirements.

In some examples, for a cache region of size 4 GB on the FPGA DRAM, and a block size of 4 KB, the total capacity of the cache is approximately one million blocks. For illustrative purposes, a fully-associative cache with a Least Recently Used (LRU) replacement policy can be implemented on the host side with around 5.2 Megabytes of memory. This number is calculated by considering 1 bit for valid bit, 20 bit for tag bit, and 20 bit for replacement policy (assuming a perfect LRU is used) for each cache block. As the example shows, the storage overhead of the host side is nearly three orders of magnitude less than the size of the cache itself.

In some aspects, the disclosed systems are described in connection with an example of a neural recommendation system for explanation purposes. It is understood that the disclosure can be used with other applications and systems without reducing the scope of the embodiments. In the example recommendation system, the system can hold data in the form of a set of embedding tables that are stored on the SSD. In other aspects, a given operation such as a sparse length sum operation on the embedding tables can be offloaded to the FPGA on the computational storage device. Further, the FPGA's DRAM can be used as a cache for the data stored on the SSD to improve the performance of the kernel on the FPGA (e.g. sparse length sum). The sparse length sum operation can exhibit many random access to different entries in the embedding tables. Inquiring the SSD for every access is costly and the system may fail to achieve a performance metric such a target latency. Therefore, the disclosed systems use the DRAM memory as a cache to minimize the accesses to the SSD. The disclosure thereby use a caching technique that can deployed to manage the DRAM storage as a cache in the SSD.

Any of the processing elements described above and variously herein may include any type of apparatus that may process data including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. One or more of the processing elements 320 may include fixed and/or programmable functionality to perform any functions such as compression and/or decompression, encryption and/or decryption, microservices, erasure coding, video encoding and/or decoding, database acceleration, search, machine learning, graph processing, and/or the like.

Figure 5:
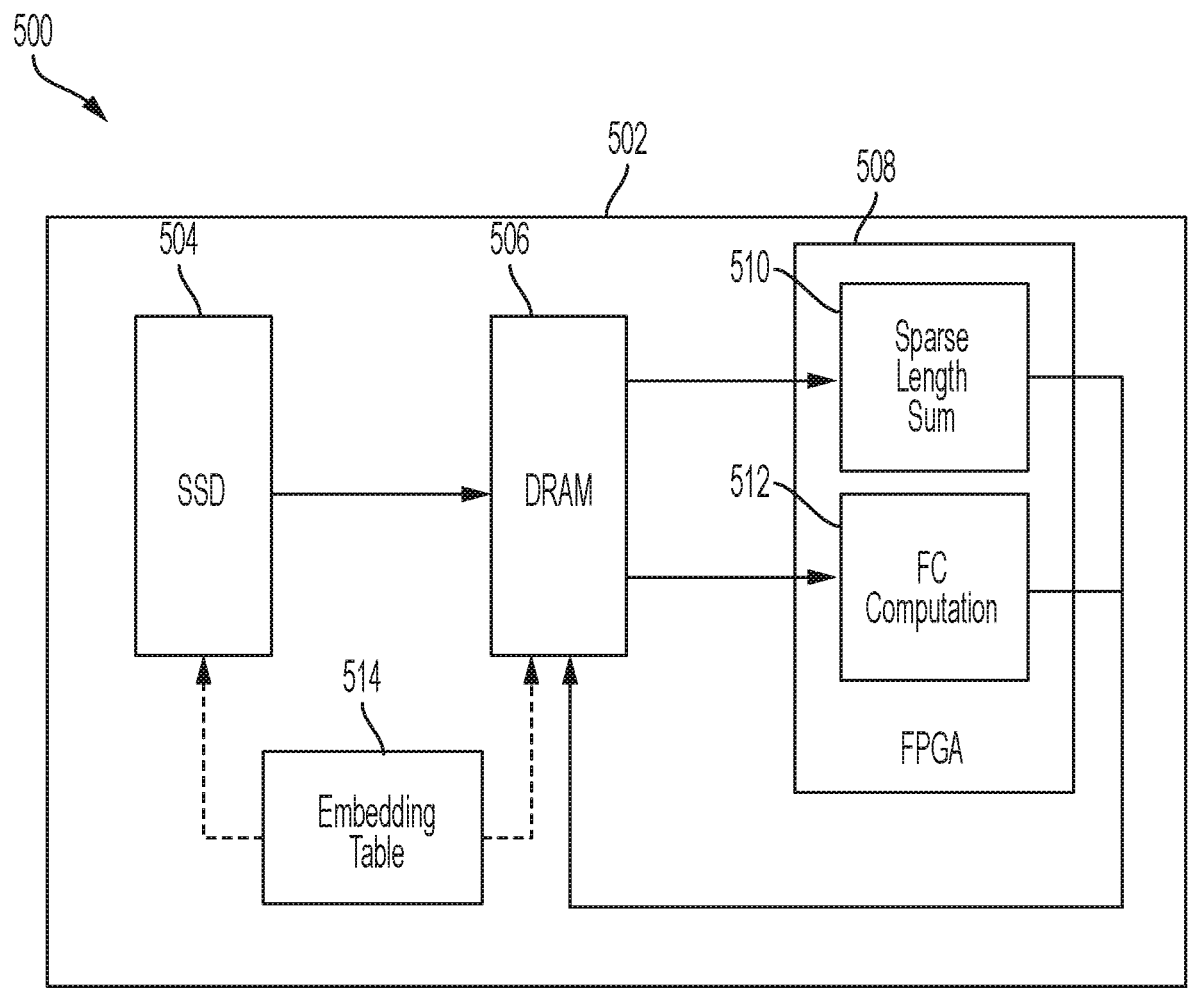
FIG. 5 depicts another example architecture associated with the disclosed systems, in accordance with example embodiments of the disclosure.

FIG. 5 depicts another diagram 500 of an example architecture associated with the disclosed systems, in accordance with example embodiments of the disclosure. In particular, architecture 502 shows an example of two computations being offloaded to the FPGA 508 for an example recommender application: (1) a sparse length sum unit 510 that features the embedding table 514 lookups and (2) a matrix-matrix multiplication unit 512. The sparse length sum unit 510 can address categorical input (i.e., sparse features) and the matrix-matrix multiplication unit 512 can perform FC layers that extract the dense features. In some aspects, the FPGA 508 reads inputs from the DRAM 506 and writes the result of the computation back to the DRAM 506. Further, there can be two storage options for storing embedding tables 514 on a solid state drive 504. For smaller models, embedding tables 514 can be stored on the FPGA external DRAM 506. Some solid state drives can support a sufficient DRAM memory size (e.g., up to about 4 GB of DRAM memory). If the size of the embedding tables 514 exceeds the FPGA DRAM's 506 capacity, the embedding tables 514 can be stored on the SSD 504, which can provide up to terabytes of storage. In another example, the example system architecture 502 can serve to target inference tasks and operations. Hence, the values in the embedding tables 514 and the weights in the FC layers 512 can be fixed. Hence, all design input features (e.g., embedding tables 514 and FC layer weights, not shown) can be placed into the FPGA DRAM 506 or the SSD 504 before the computation. The host CPU (not shown) can provide the inputs to the kernel on the FPGA 508. For example, the disclosed systems can generate two input vectors based on each user request, one belonging to the bottom FC layer, and another for embedding table 514 lookups. The FPGA 508 can perform the computation and can write the result back to main memory (not shown) accessible by the CPU.

Figure 6:
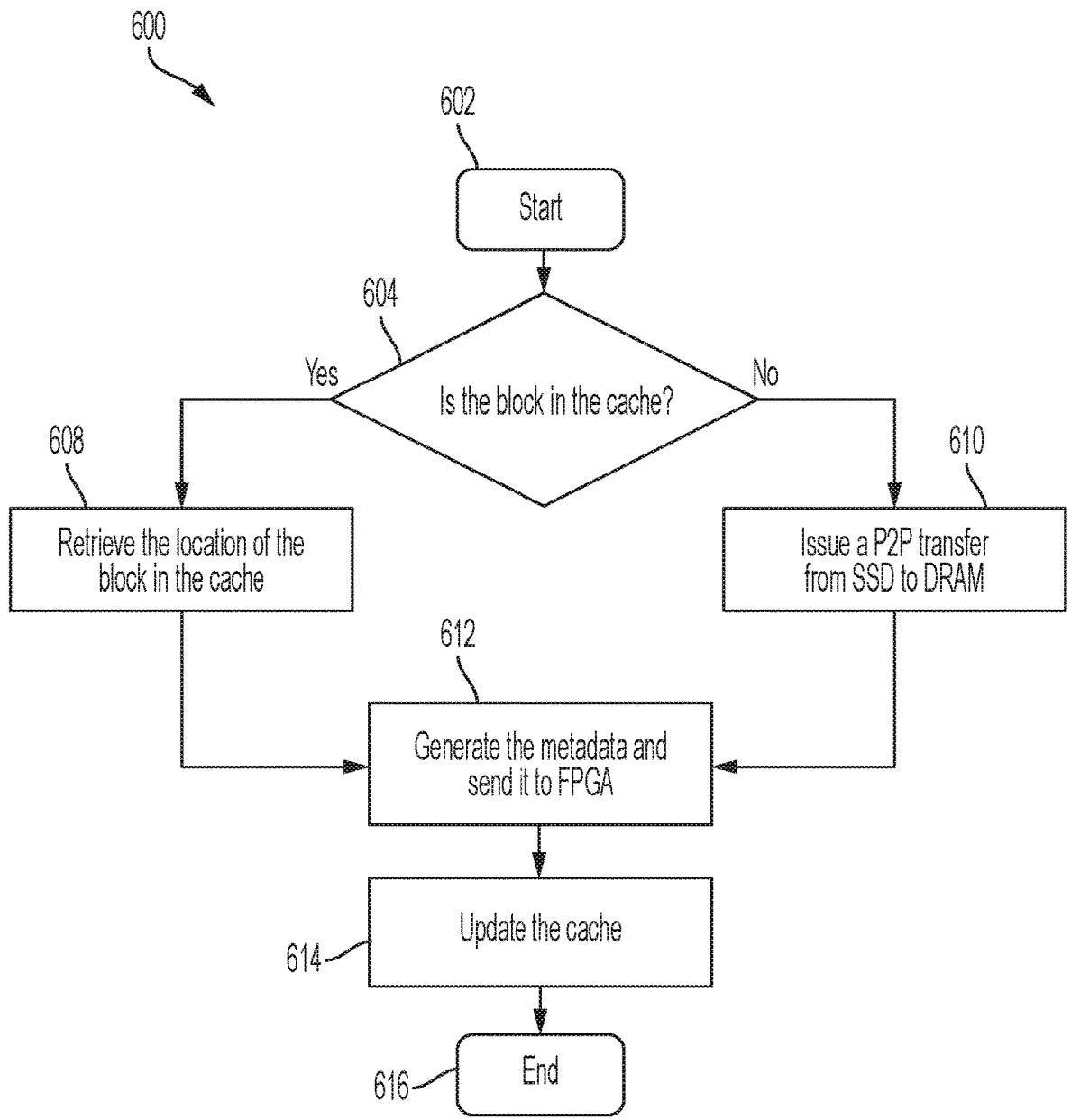
FIG. 6 shows an example flow showing various operations associated with disclosed systems, in accordance with example embodiments of the disclosure.

FIG. 6 shows a diagram 600 of an example flow showing various operations associated with disclosed systems, in accordance with example embodiments of the disclosure. At block 602, the disclosed systems can start the process for offloading operations and/or computations to a storage device such as an SSD in association with a processing element. At block 604, the disclosed systems can determine whether a particular block is in the cache. If yes, at block 608, the disclosed systems can retrieve the location of the block in the cache. If not, at block 610, the disclosed systems can issue a P2P transfer from the SSD to the DRAM. Then at block 612, the disclosed systems can generate corresponding metadata and send the metadata to the FPGA. At block 614, the disclosed systems can update the cache. At block 616, the disclosed systems can end the process for offloading the computations and/or operations.

In some embodiments, the operations and/or computations can include any suitable device program including instructions (e.g., a program, kernel, module, subroutine, interrupt handler, driver, and/or the like) that may be executed on storage device and may enable a user to manage the storage device, manage one or more user programs on the storage device, access one or more supporting features implemented on the storage device (e.g., tracing, debugging, profiling, and/or the like), access an operating system on the storage device, and/or the like. Examples of device programs may include utilities, which may analyze, configure, optimize, maintain, monitor, and/or the like, the storage device, and/or a user program (e.g., a user application) running on the storage device.

Figure 7:
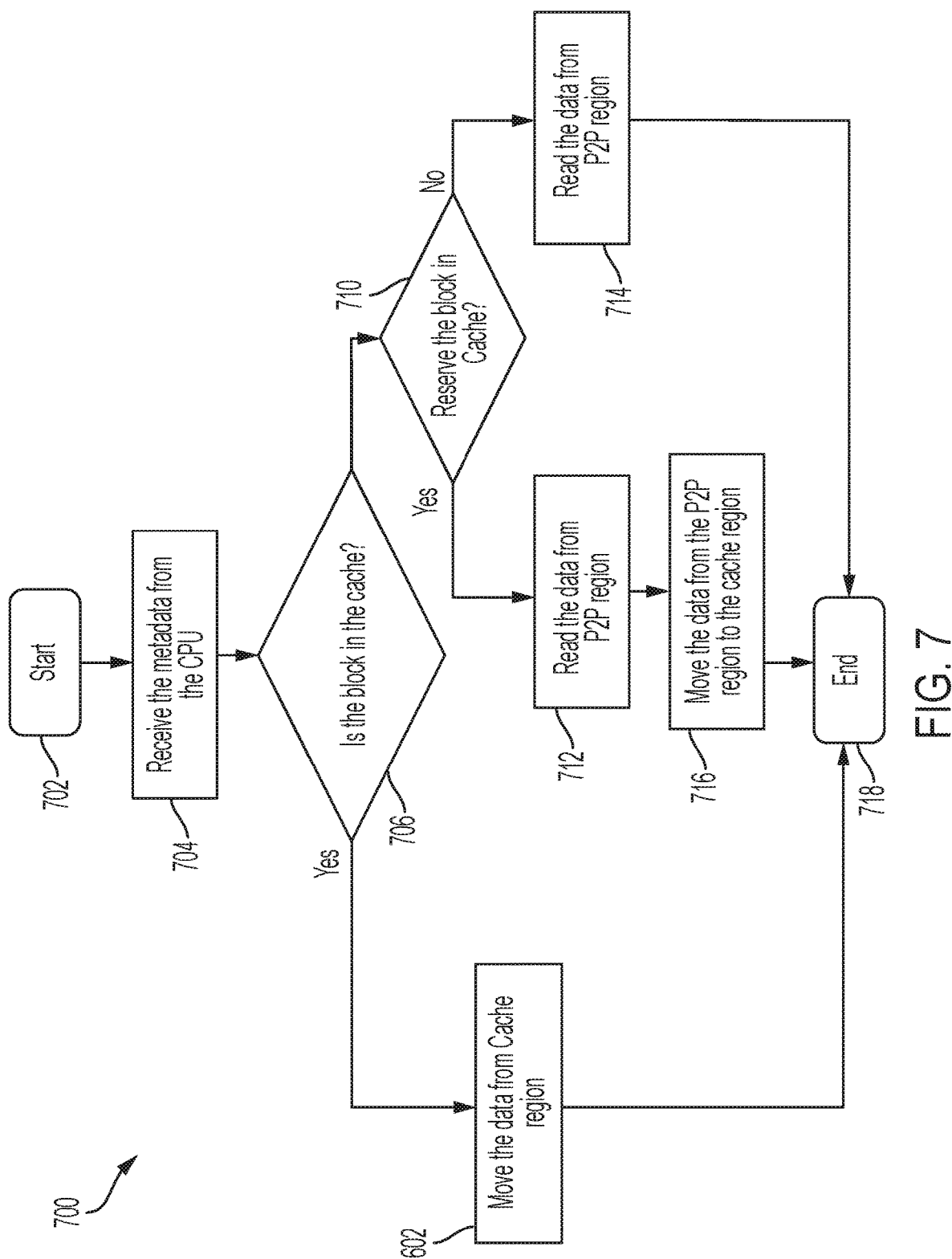
FIG. 7 shows another example flow showing various operations associated with disclosed systems, in accordance with example embodiments of the disclosure.

FIG. 7 shows another diagram 700 of an example flow showing various operations associated with disclosed systems, in accordance with example embodiments of the disclosure. At block 702, the disclosed systems can start the process for offloading operations and/or computations to a storage device in association with a processing element. At block 704, the disclosed systems can receive metadata from the CPU. At block 706, the disclosed systems can determine whether the block is in the cache. If yes, then at block 708, the disclosed systems can move the data from the cache region. If no, then at block 710, the disclosed systems can determine whether to reserve the block in cache. If yes, then at block 712, the disclosed systems can read the data from the P2P region and then, at block 716, the disclosed systems can move the data from the P2P region to the cache region. If no, then at block 714, the disclosed systems can read the data from the P2P region. At block 718, the disclosed systems can end the process for offloading the computations and/or operations.

Figure 8:
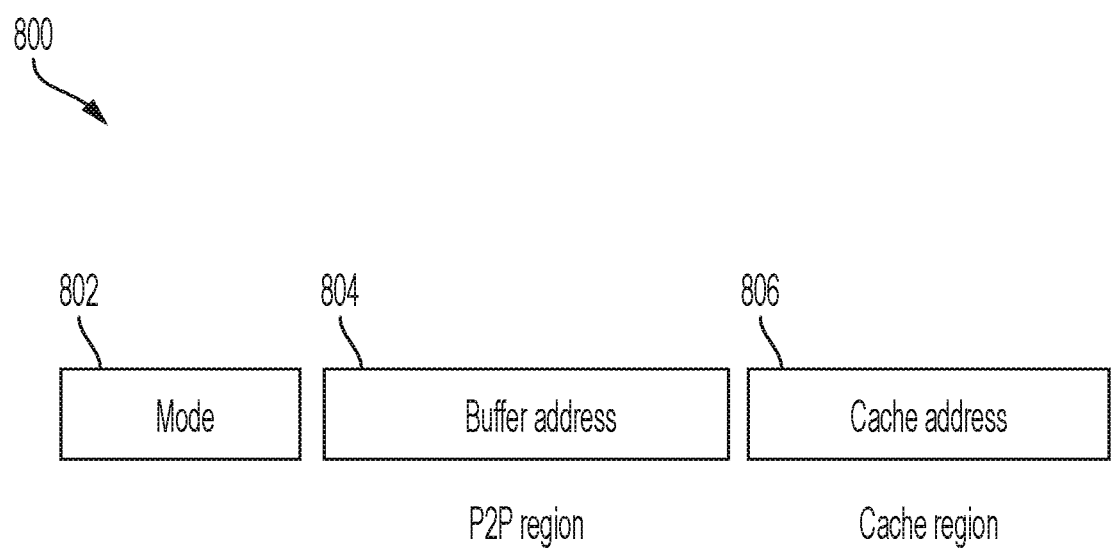
FIG. 8 shows a diagram of example metadata transmitted between the host and storage device, in accordance with example embodiments of the disclosure.

FIG. 8 shows a diagram 800 of example metadata transmitted between the host and storage device, in accordance with example embodiments of the disclosure. The host CPU can send metadata to the FPGA or other processing element associated with the storage device for various operations (e.g., an embedding table access), where the metadata can include information about memory locations associated with the operations. Diagram 800 shows the detail of the metadata, which can include a suitable number of bits (e.g., two bits) that serve as the mode 802 and can be used to identify three different possible scenarios (explained below and in connection with FIG. 9). Further, the FPGA can use cache address 806 associated with the cache region and buffer address 804 associated with the P2P region of the memory to locate the data depending on the mode 802 bits as follows. In a first mode, Mode 0, the FPGA can read the block using the address specified by the P2P buffer address 804 bit. Additionally, the FPGA can reserve the block at the address provided by the cache address 806 bits. Mode 1 can be similar to mode 0 with the difference that the FPGA may not reserve the block in the cache of the DRAM. For mode 2, the data is present in the cache of the DRAM at the address specified by the cache address 806 bits. Furthermore, the FPGA can be unaffected by the cache policy in use, thereby avoiding recompilation.

Figure 9:
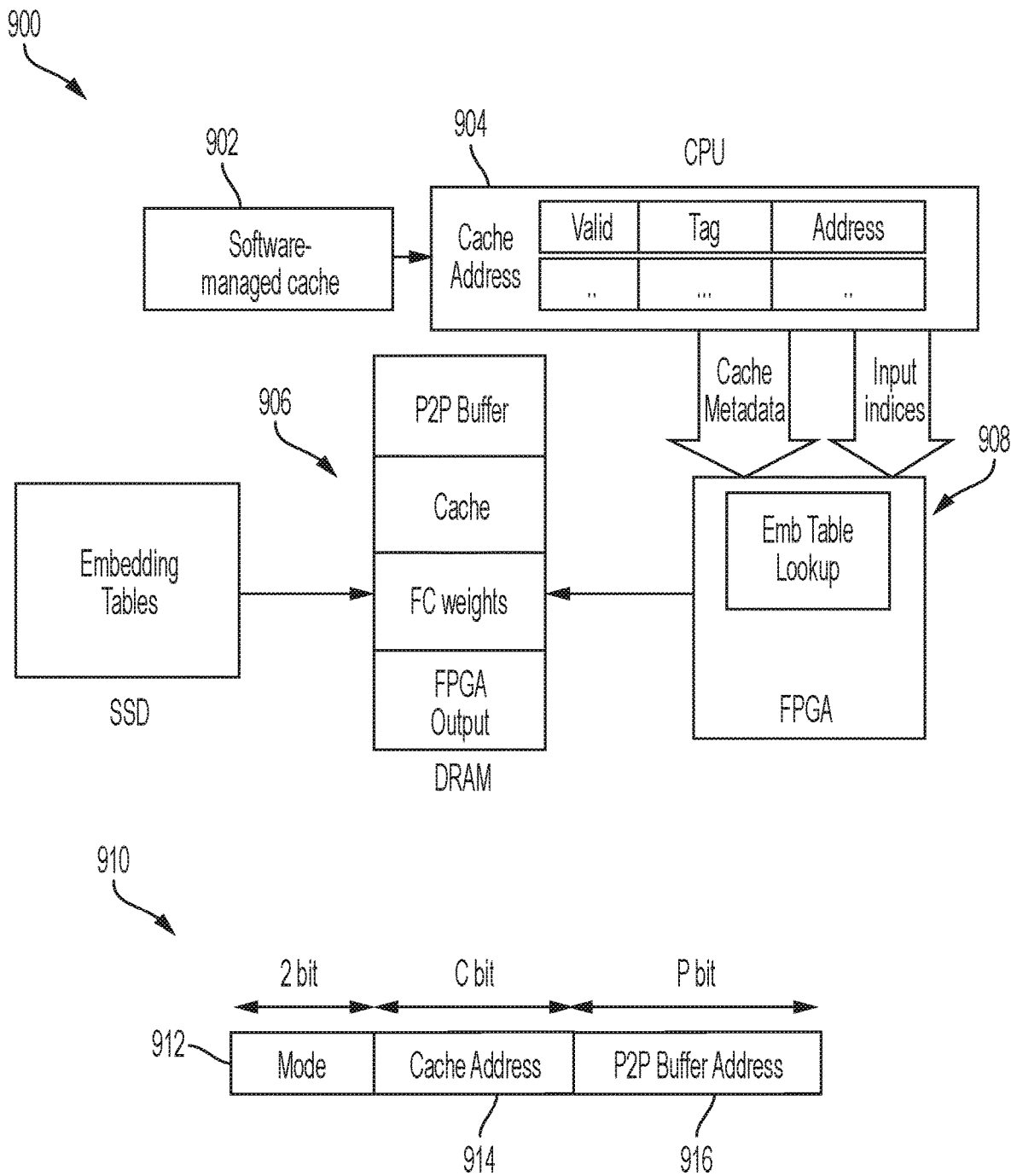
FIG. 9 shows a first diagram representing an overview of the cache design, in accordance with example embodiments of the disclosure.

FIG. 9 shows a first diagram 900 representing an overview of the cache design, in accordance with example embodiments of the disclosure. In particular, the DRAM 906 capacity into four regions: one region belongs to the data newly brought from the SSD to the DRAM via a P2P transfer and can be referred to as the P2P buffer. The second region can use a cache to reserve some previously fetched blocks in DRAM 906 and can be referred to as cache. In addition, the disclosed systems may need space on DRAM 906 to store the weights for other layers in the model (e.g., FC layers) and the output of the FPGA 908. The sizes of each region can be design parameters and can be determined based on different factors such as the number of lookups, the batch sizes, and/or the like. The P2P buffer region should be large enough to accommodate all the data required for a batch size if none of the accesses hit in the cache. The DRAM 906 can be managed by the host CPU 904 and therefore there is a software-managed cache 902. The CPU 904 can issue a P2P read from SSD to DRAM 906 for the data not present in the cache of the DRAM 906. The host CPU can send metadata to the FPGA 908 for each embedding table access to convey the information about the location of each access. Diagram 910 shows the detail of the metadata provided to the FPGA 908 by the CPU 904. The metadata consists of three parts: a suitable number of bits (e.g., two bits) can serve as the mode 912 and can be used to identify three different possible scenarios (explained below). Further, the FPGA 908 can use cache address 914 and P2P buffer address 916 to locate the data depending on the mode 912 bits as follows. In a first mode, Mode 0, the data block may not be present in the cache of the DRAM 906. The FPGA 908 can therefore read the block using the address specified by the P2P buffer address 916 bit. Additionally, the FPGA 908 can reserve the block at the address provided by the cache address 914 bits. Mode 1 can be similar to mode 0 with the difference that the FPGA 908 may not reserve the block in the cache of the DRAM 906. For mode 2, the data is present in the cache of the DRAM 906 at the address specified by the cache address 914 bits. Using a software-managed cache (e.g., software managed cache 902) can allow a user to choose the right caching scheme based on the access pattern and data profiling results. Finally, in one embodiment, the FPGA 908 can be unaffected by the cache policy in use, thereby avoiding recompilation.

Figure 10:
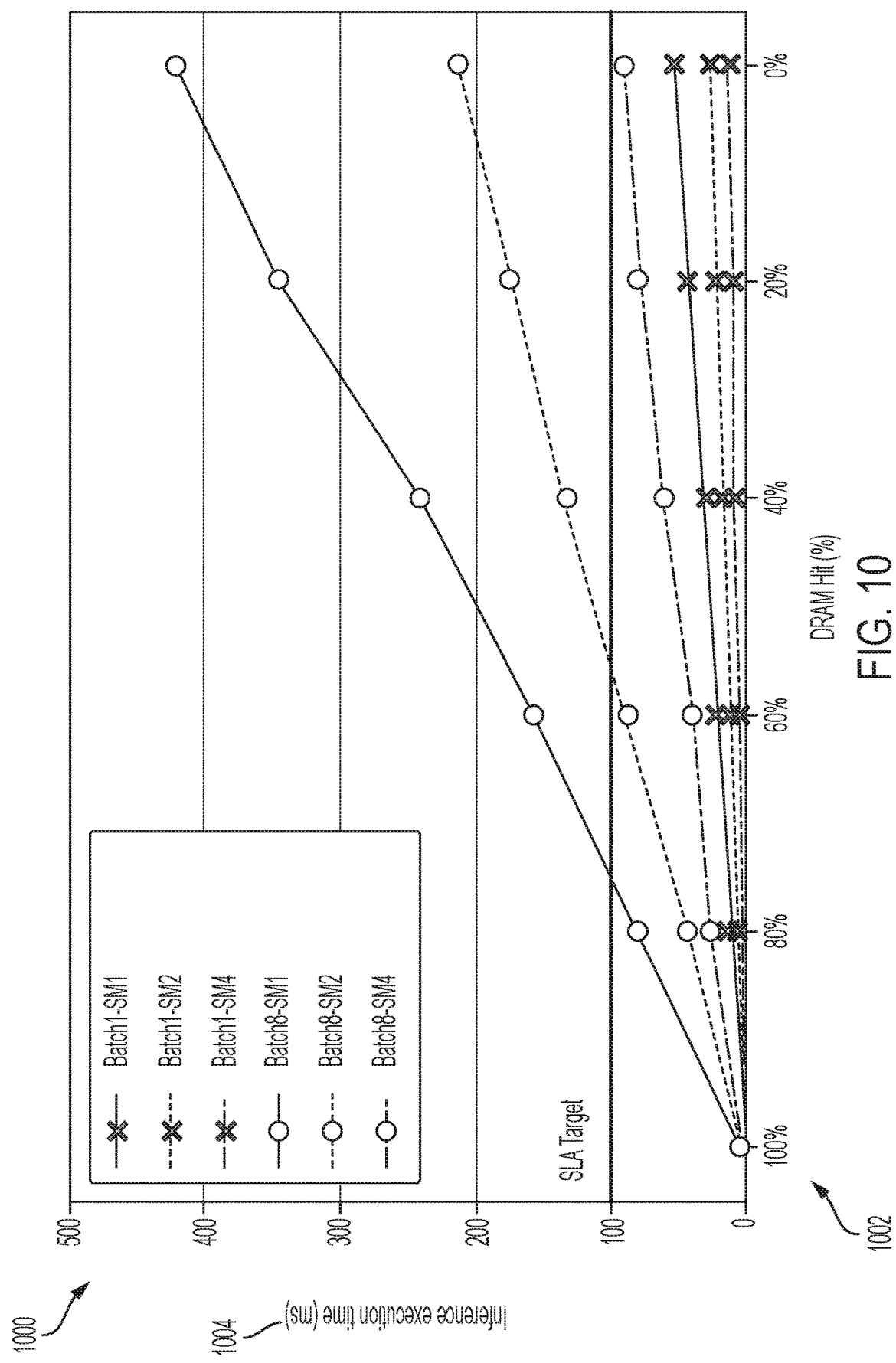
FIG. 10 shows examples of execution times of different models on a solid state drive having a processing element (e.g., a field programmable gate array, FPGA) for different batch sizes (e.g., batch size 1 and batch size 8), in accordance with example embodiments of the disclosure.

FIG. 10 shows a diagram 1000 of examples of inference execution times (y-axis 1004) of different models on a solid state drive having a processing element (e.g., an FPGA) for different batch sizes (e.g., batch size 1 and batch size 8), in accordance with example embodiments of the disclosure. In particular, the X-axis 1002 shows the cache hit ratios. In some aspects, a 100% cache hit ratio can be considered as being equivalent to a case where embedding tables of the model are sized to fit on the FPGA DRAM. Further, the zero percentage cache hit ratio represents a scenario in which none of the lookups are available on the FPGA DRAM. For each model, corresponding service level agreement (SLA) requirements are shown with a horizontal line. The SLA targets for RMC1, RMC2, and RMC3 are approximately 100 milliseconds (ms), 400 ms, and 100 ms, respectively. For batch size 1, the execution time is within the required target for all three models. However, the execution time does not meet the target for larger batch sizes for a low cache hit rate. For example, for RMC1, for less than 80% cache hit rates, the execution time for one SmartSSD® (SM1) starts to exceed the SLA target. For the case of 4 SmartSSDs®, the execution time meets the requirement for all the cache hit rates.

Figure 11:
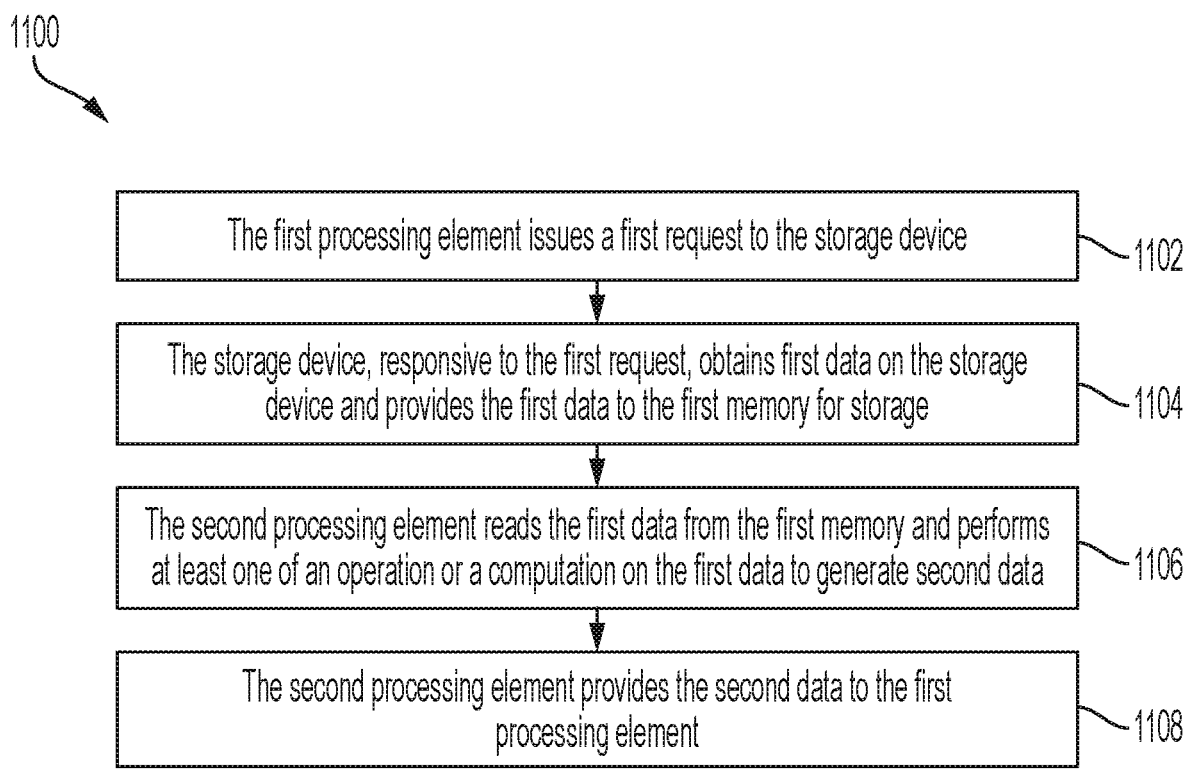
FIG. 11 is an illustration of another exemplary operational flow illustrating example operations associated with the disclosed systems, in accordance with example embodiments of the disclosure.

FIG. 11 shows a diagram 1100 of an example flow showing various operations associated with disclosed systems, in accordance with example embodiments of the disclosure. In particular, diagram 1100 shows an example flow for offloading operations and/or computations to a storage device such as an SSD in association with a processing element. At block 1102, the first processing element issues a first request to the storage device. At block 1104, the storage device, responsive to the first request, obtains first data on the storage device and provides the first data to the first memory for storage. At block 1106, the second processing element reads the first data from the first memory and performs at least one of an operation or a computation on the first data to generate second data. At block 1108, the second processing element provides the second data to the first processing element.

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the functionality described herein, including any of the host functionality, device functionally, and/or the like described above with respect to the embodiments disclosed herein may be implemented with hardware, software, or any combination thereof including. For example, they may be implemented with combinational logic, sequential logic, one or more timers, counters, registers, state machines, volatile memories such as DRAM and/or static random access memory (SRAM), nonvolatile memory and/or any combination thereof, CPLDs, FPGAs, ASICs, CPUs including complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

The embodiments illustrated described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Figure 12:
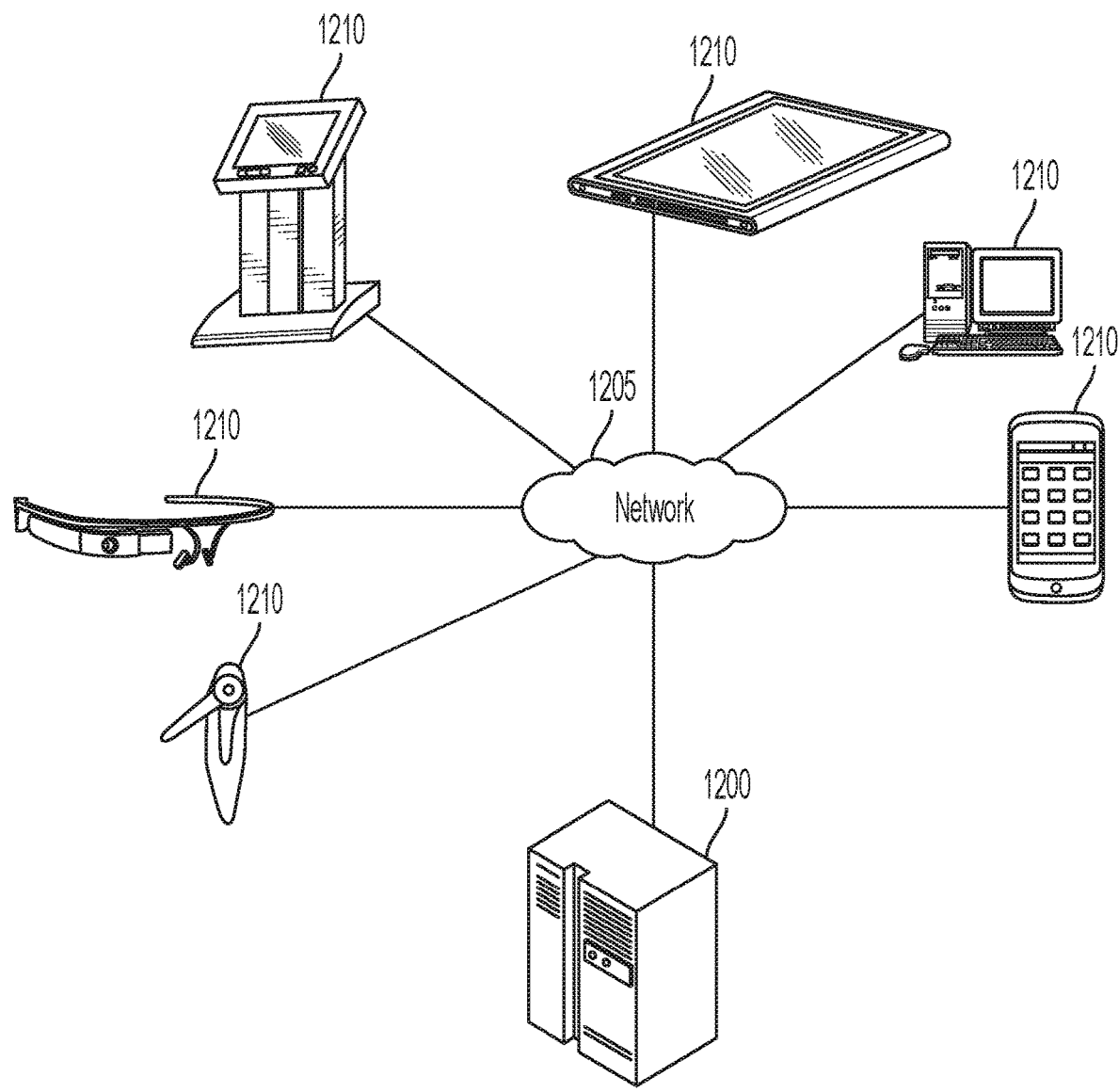
FIG. 12 shows an example schematic diagram of a system that can be used to practice embodiments of the present disclosure.

FIG. 12 shows an example schematic diagram of a system that can be used to practice embodiments of the present disclosure. As shown in FIG. 12, this particular embodiment may include one or more management computing entities 1200, one or more networks 1205, and one or more user devices 1210 (e.g., host devices, storage devices, additional devices, etc.). In various embodiments, the management computing entities 1200 can be configured to run operations associated with the disclosed systems and associated embodiments described throughout the disclosure. Further, the management computing entities 1200 can reside in any suitable portion of the disclosed systems (e.g., such as a storage device manager, host application, a remote host, another device, combinations thereof, and/or the like). Each of these components, entities, devices, systems, and similar words used herein interchangeably may be in direct or indirect communication with, for example, one another over the same or different wired or wireless networks. Additionally, while FIG. 12 illustrates the various system entities as separate, standalone entities, the various embodiments are not limited to this particular architecture. As noted, the communications can be performed using the any suitable protocols described further herein.

Figure 13:
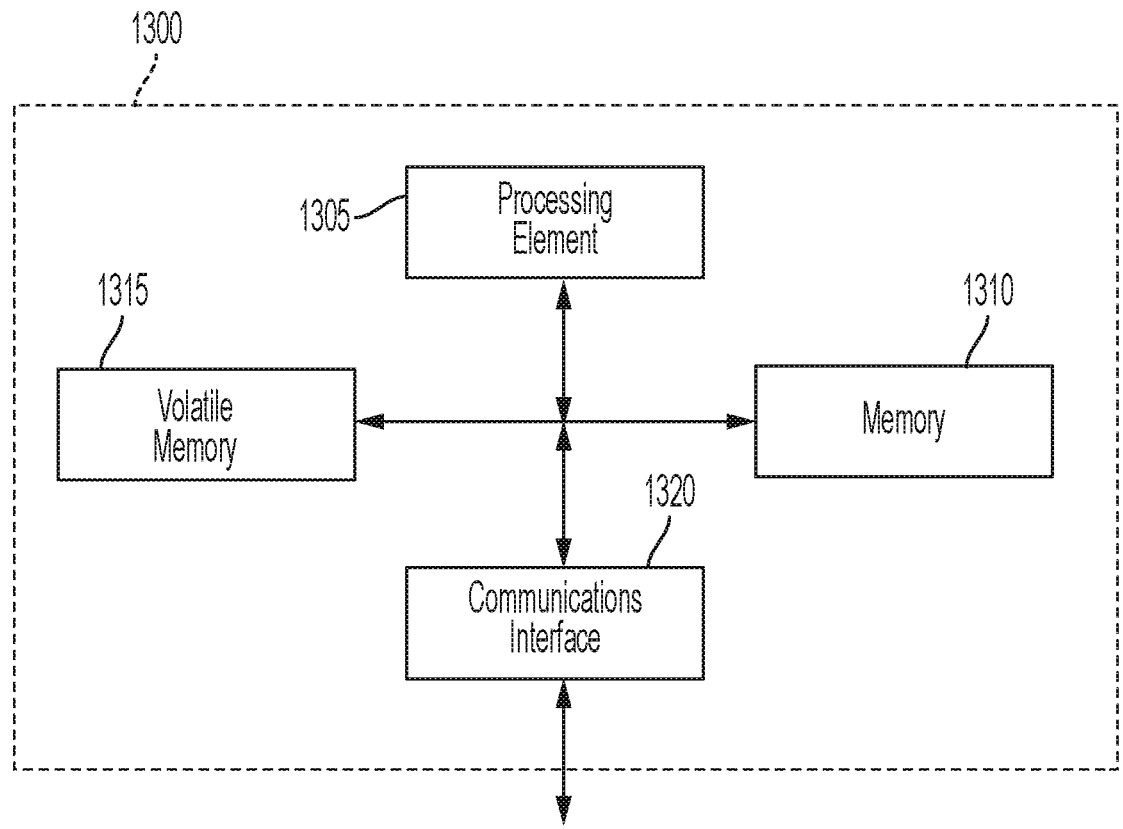
FIG. 13 shows an example schematic diagram of a management computing entity, in accordance with example embodiments of the disclosure.

FIG. 13 shows an example schematic diagram 1300 of a management computing entity, in accordance with example embodiments of the disclosure. As noted, the management computing entity can be configured to run operations associated with the disclosed systems and associated embodiments described throughout the disclosure. Further, the management computing entities 1200 can reside in any suitable portion of the disclosed systems. In particular, a content component may serve to determine signals indicative of data (e.g., video, audio, text, data, combinations thereof, and/or the like) to be transmitted over the system described herein. In another embodiment, the determination of the signal for transmission may be, for example, based on a user input to a device, a predetermined schedule of data transmissions on a network associated with the system, changes in network conditions, and the like. In one embodiment, the signal may include that data may be encapsulated in a data frame and/or packet that is configured to be sent from a device to one or more devices on the network.

In another embodiment, the processing element 1305 may serve to determine various parameters associated data transmitted over the network associated with the disclosed systems. As another example. the processing element 1305 may serve perform various acceleration operations such as at least portions of an offload functionality, data pre- or post-processing, combinations thereof, and/or the like.

In one embodiment, a transmitting component (not shown) may serve to transmit the signal from one device to another device on the network. For example, the transmitting component may serve to prepare a transmitter (e.g., transmitter 1204 of FIG. 12, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 1200 may also include one or more communications interfaces 1320 for communicating with various computing entities, such as by communicating data, content, information, and/or similar terms used herein interchangeably that can be transmitted, received, operated on, processed, displayed, stored, and/or the like. For instance, the management computing entity 1200 may communicate with user devices 1210 and/or a variety of other computing entities.

As shown in FIG. 13, in one embodiment, the management computing entity 1200 may include or be in communication with one or more processing elements 1305 (also referred to as processors, processing circuitry, and/or similar terms used herein interchangeably) that communicate with other elements within the management computing entity 1200 via a bus, for example. As will be understood, the processing element 1305 may be embodied in a number of different ways. For example, the processing element 1305 may be embodied as one or more complex programmable logic devices (CPLDs), microprocessors, multi-core processors, coprocessing entities, application-specific instruction-set processors (ASIPs), microcontrollers, and/or controllers. Further, the processing element 1305 may be embodied as one or more other processing devices or circuitry. The term circuitry may refer to an entirely hardware embodiment or a combination of hardware and computer program products. Thus, the processing element 1305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1305 may be configured for a particular use or configured to execute instructions stored in volatile or non-volatile media or otherwise accessible to the processing element 1305. As such, whether configured by hardware or computer program products, or by a combination thereof, the processing element 1305 may be capable of performing steps or operations according to embodiments of the present disclosure when configured accordingly.

In one embodiment, the management computing entity 1200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 1310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 1200 may further include or be in communication with volatile media (also referred to as volatile storage, memory, memory storage, memory circuitry and/or similar terms used herein interchangeably). In one embodiment, the volatile storage or memory may also include one or more volatile storage or memory media 1315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 1305. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 1200 with the assistance of the processing element 1305 and operating system.

As indicated, in one embodiment, the management computing entity 1200 may also include one or more communications interfaces 1320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 1200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, 5G protocol, wireless universal serial bus (USB) protocols, and/or any other wireless protocol.

Although not shown, the management computing entity 1200 may include or be in communication with one or more input elements, such as a keyboard input, a mouse input, a touch screen/display input, motion input, movement input, audio input, pointing device input, joystick input, keypad input, and/or the like. The management computing entity 1200 may also include or be in communication with one or more output elements (not shown), such as audio output, video output, screen/display output, motion output, movement output, and/or the like.

As will be appreciated, one or more of the management computing entity's 1200 components may be located remotely from other management computing entity 1200 components, such as in a distributed system. Furthermore, one or more of the components may be combined and additional components performing functions described herein may be included in the management computing entity 1200. Thus, the management computing entity 1200 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 1210 that includes one or more components that are functionally similar to those of the management computing entity 1200.

In various aspects, the processing component, the transmitting component, and/or the receiving component (not shown) may be configured to operate on one or more may include aspects of the functionality of the management computing entity 1200, as shown and described in connection with FIGS. 12 and 13 here. In particular, the processing component, the transmitting component, and/or the receiving component may be configured to be in communication with one or more processing elements 1305, memory 1310, volatile memory 1315, and may include a communication interface 1320 (e.g., to facilitate communication between devices).

Figure 14:
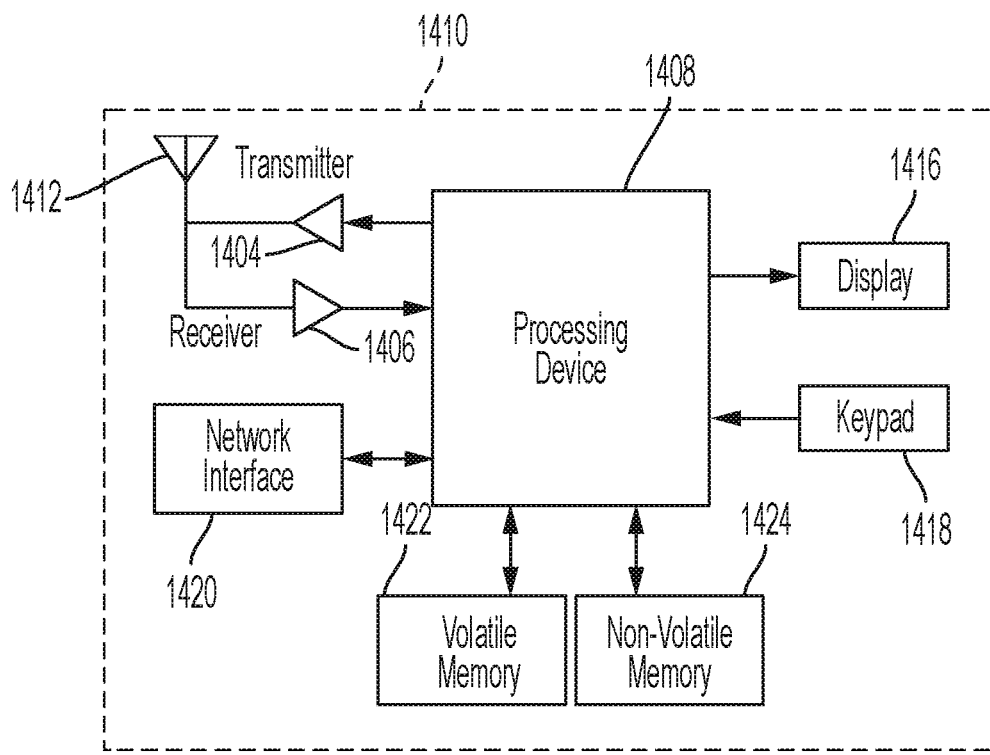
FIG. 14 shows an example schematic diagram of a user device, in accordance with example embodiments of the disclosure.

FIG. 14 shows an example schematic diagram of a user device, in accordance with example embodiments of the disclosure. FIG. 14 provides an illustrative schematic representative of a user device 1410 (e.g., a host device, a storage device, a peripheral device, etc.) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 1410 can be operated by various parties. As shown in FIG. 14, the user device 1410 can include an antenna 1412, a transmitter 1404 (for example radio), a receiver 1406 (for example radio), and a processing element 1408 (for example CPLDs, FPGAs, microprocessors, multi-core processors, coprocessing entities, ASIPs, microcontrollers, and/or controllers) that provides signals to and receives signals from the transmitter 1404 and receiver 1406, respectively.

The signals provided to and received from the transmitter 1404 and the receiver 1406, respectively, may include signaling information in accordance with air interface standards of applicable wireless systems. In this regard, the user device 1410 may be capable of operating with one or more air interface standards, communication protocols, modulation types, and access types. More particularly, the user device 1410 may operate in accordance with any of a number of wireless communication standards and protocols, such as those described above with regard to the management computing entity 1400 of FIG. 14. In a particular embodiment, the user device 1410 may operate in accordance with multiple wireless communication standards and protocols, such as the disclosed IoT DOCSIS protocol, UMTS, CDMA2000, 1xRTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 1410 may operate in accordance with multiple wired communication standards and protocols, such as those described above with regard to the management computing entity 1400 via a network interface 1420.

Via these communication standards and protocols, the user device 1410 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 1410 can also download changes, add-ons, and updates, for instance, to its firmware, software (for example including executable instructions, applications, program components), and operating system.

According to one embodiment, the user device 1410 may include location determining aspects, devices, components, functionalities, and/or similar words used herein interchangeably. The location determining aspects may be used to inform the models used by the management computing entity and one or more of the models and/or machine learning techniques described herein. For example, the user device 1410 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 1410 position in connection with a variety of other systems, including cellular towers, Wi-Fi access points, and/or the like. Similarly, the user device 1410 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 1410 may also comprise a user interface (that can include a display 1416 coupled to a processing element 1408) and/or a user input interface (coupled to a processing element 1408). For example, the user interface may be a user application, browser, user interface, and/or similar words used herein interchangeably executing on and/or accessible via the user device 1410 to interact with and/or cause display of information from the management computing entity 1400, as described herein. The user input interface can comprise any of a number of devices or interfaces allowing the user device 1410 to receive data, such as a keypad 1418 (hard or soft), a touch display, voice/speech or motion interfaces, or other input devices. In embodiments including a keypad 1418, the keypad 1418 can include (or cause display of) the conventional numeric (0-9)

and related keys (#, *), and other keys used for operating the user device 1410 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 1410 can also include volatile storage or memory 1422 and/or non-volatile storage or memory 1424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1410. As indicated, this may include a user application that is resident on the entity or accessible through a browser or other user interface for communicating with the management computing entity 1400 and/or various other computing entities.

In another embodiment, the user device 1410 may include one or more components or functionality that are the same or similar to those of the management computing entity 1400, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for computational offloading, comprising:
   a storage device in communication with a first processing element and a second processing element;
   the second processing element comprising a first memory, the first memory connected to the storage device via a first connection, wherein:
   the first processing element issues a first request to the storage device;
   the storage device, responsive to the first request, obtains first data on the storage device and provides the first data to the first memory for storage;
   the second processing element reads the first data from the first memory and performs at least one of an operation or a computation on the first data to generate second data; and
   the second processing element provides the second data to the first processing element, wherein a caching policy for the first memory is configurable by the first processing element based on a part of a metadata from the first processing element, and wherein the metadata comprises a cache mode for the second processing element and a location of the first data in the first memory.

2. The system of claim 1, wherein the first processing element provides the metadata to the second processing element, the metadata associated with the computation.

3. The system of claim 1, wherein the storage device comprises a solid state drive and the first memory comprises a dynamic random-access memory (DRAM).

4. The system of claim 1, wherein the first processing element comprises a central processing unit of a host device.

5. The system of claim 1, wherein the second processing element comprises at least one of a field-programmable gate array (FPGA), a complex programmable logic device (CPLD), an application-specific integrated circuit (ASIC), or a co-processor and the first connection includes a peer-to-peer (P2P) connection.

6. The system of claim 1, wherein a block size associated with the first memory is set by an application associated with the first processing element.

7. The system of claim 1, wherein the second processing element communicates with the storage device via a switch.

8. The system of claim 7, wherein the switch comprises a Peripheral Component Interconnect Express (PCIe) switch.

9. The system of claim 1, wherein the first memory comprises a first portion accessible by the first processing element and accessible by the second processing element and wherein the first portion is used for the providing the second data to the first processing element.

10. A method for computational offloading, comprising:
    issuing, by a first processing element, a first request to a storage device;
    obtaining, by the storage device, responsive to the first request, first data on the storage device and providing the first data to a first memory of a second processing element for storage;
    reading, by the second processing element, the first data from the first memory;
    performing at least one of an operation or a computation on the first data to generate second data; and
    providing, by the second processing element, the second data to the first processing element, wherein a caching policy for the first memory is configurable by the first processing element based on a part of a metadata from the first processing element, and wherein the metadata comprises a cache mode for the second processing element and a location of the first data in the first memory.

11. The method of claim 10, further comprising providing, by the first processing element the metadata to the second processing element, the metadata associated with the computation.

12. The method of claim 10, further comprising setting a block size associated with the first memory by an application associated with the first processing element.

13. The method of claim 10, further comprising communicating, via a switch, at least one message between the second processing element and the storage device.

14. A non-transitory computer-readable storage medium comprising computer-executable instructions for computational offloading, that when executed by a processor, perform operations comprising:
  issuing, by a first processing element, a first request to a storage device;
  obtaining, by the storage device, responsive to the first request, first data on the storage device and providing the first data to a first memory of a second processing element for storage;
  reading, by the second processing element, the first data from the first memory;
  performing at least one of an operation or a computation on the first data to generate second data; and
  providing, by the second processing element, the second data to the first processing element, wherein a caching policy for the first memory is configurable by the first processing element based on a part of a metadata from the first processing element, and wherein the metadata comprises a cache mode for the second processing element and a location of the first data in the first memory.

15. The non-transitory computer-readable storage medium of claim 14, further comprising providing, by the first processing element the metadata to the second processing element, the metadata associated with the computation.

16. The non-transitory computer-readable storage medium of claim 14, further comprising setting a block size associated with the first memory by an application associated with the first processing element.

17. The non-transitory computer-readable storage medium of claim 14, further comprising communicating, via a switch, at least one message between the second processing element and the storage device.

* * * * *